United States Patent
Bryant et al.

(10) Patent No.: US 7,712,534 B2
(45) Date of Patent: May 11, 2010

(54) TREATMENT FLUIDS HAVING BIOCIDE AND FRICTION REDUCING PROPERTIES AND ASSOCIATED METHODS

(75) Inventors: Jason E. Bryant, Duncan, OK (US); David E. McMechan, Duncan, OK (US); Michael A. McCabe, Duncan, OK (US); J. Michael Wilson, Duncan, OK (US); Karen L. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 120 days.

(21) Appl. No.: 12/049,052

(22) Filed: Mar. 14, 2008

(65) Prior Publication Data

US 2009/0229827 A1    Sep. 17, 2009

(51) Int. Cl.
*E21B 43/16* (2006.01)
*E21B 43/26* (2006.01)

(52) U.S. Cl. ............... 166/305.1; 166/300; 166/308.1; 166/308.2

(58) Field of Classification Search ....................... None
See application file for complete search history.

(56) References Cited

U.S. PATENT DOCUMENTS

| | | | |
|---|---|---|---|
| 7,004,254 B1 | 2/2006 | Chatterji et al. | 166/279 |
| 7,232,793 B1 | 6/2007 | King et al. | 507/225 |
| 7,271,134 B2 | 9/2007 | King et al. | 507/226 |
| 7,287,593 B2 * | 10/2007 | Hutchins et al. | 166/308.5 |
| 2006/0116296 A1 * | 6/2006 | Kippie et al. | 507/244 |
| 2009/0062156 A1 | 3/2009 | Wilson et al. | |

\* cited by examiner

*Primary Examiner*—Zakiya W Bates
*Assistant Examiner*—Angela M DiTrani
(74) *Attorney, Agent, or Firm*—Robert A. Kent (57) ABSTRACT

Methods and compositions that include a method comprising providing a treatment fluid that comprises an aqueous base fluid, a biocide, a biocide enhancer, a friction reducer, and a compatibility aid, and introducing the treatment fluid into a subterranean formation. A composition provided includes a treatment fluid comprising an aqueous base fluid, a biocide, a biocide enhancer, a friction reducer, and a compatibility aid.

12 Claims, 7 Drawing Sheets

TREATMENT FLUIDS HAVING BIOCIDE AND FRICTION REDUCING PROPERTIES AND ASSOCIATED METHODS

BACKGROUND

The present invention relates to treatment fluids that are suitable for use in subterranean operations. Among their many benefits, the treatment fluids provide compatible biocide and friction reducing treating effects in a subterranean treatment fluid in a subterranean operation such as a drilling, completion, or stimulation operation. Associated methods are also disclosed.

When treatment fluids utilized in drilling or stimulating oil or gas wells contain an undesirable bioburden, those fluids when introduced into a subterranean formation can undesirably contaminate the subterranean formation. As used herein, the term "bioburden" refers to the bacteria that exist as members of a biofilm, a meta-community consisting of microbial cells (algal, fungal or bacterial) and the extracellular biopolymers the cells produce in a water system. An example of what might be considered an undesirable bioburden may be the presence of bacterial slime which plugs permeability flow paths, impairing the production of oil and gas from subterranean formations. Also, bacterial action or the bi-products of their activity (e.g., hydrogen sulfide production), which may corrode production or transport piping, may be considered an undesirable bioburden. As used herein, the term "treatment fluid" refers to any fluid that may be used in a subterranean application in conjunction with a desired function and/or for a desired purpose. The term "treatment fluid" does not imply any particular action by the fluid or any component thereof.

Anaerobic bacteria and particularly sulfate reducing bacteria (SRB), present in the fluid can lead to a variety of undesirable outcomes if introduced into the subterranean formation. For instance, once in the formation, if the bacteria produce sludge or slime, they can cause a reduction in the porosity of the formation, which in turn is thought to reduce the production of oil and/or gas therefrom. Additionally, sulfate reducing bacteria produce hydrogen sulfide, which, even in small quantities, causes many problems. For instance, the presence of hydrogen sulfide in produced oil and gas can cause excessive corrosion in metal tubular goods and surface equipment, damage to treating chemicals lowering their effectiveness, a lower oil selling price, and a necessity to remove hydrogen sulfide from gas prior to sale.

When a formation that has been fractured becomes overly contaminated with bacteria, e.g., by the introduction of bacteria through the fracturing fluid used during the fracturing treatment, or through other fluids such as drilling fluids, workover fluids, and kill fluids, the presence of the bacteria can be particularly problematic. In some instances, the bacteria can be long distances from the well bore as a result of having been carried into fractures in the formation by the fracturing fluid. Combating the bacteria in such formations often proves to be difficult. For instance, oftentimes the bactericide cannot reach the bacteria in these fractures. Thus, the bactericide cannot reach the bacteria. Additionally, the proppant materials in the previously formed fractures may be disturbed, thereby reducing the permeability of the formation.

In order to effectively treat water against bacterial contamination, a fast acting biocide is needed. This may be even more important for on-the-fly treatments, where biocides have a very short contact time with the water before other treating chemicals are added and the fluids are pumped down hole. To get an effective fast kill of bacteria, in some instances it is believed to be helpful to include a biocide enhancer to aid the biocide treatments or work synergistically with the biocide. Specific classes of chemicals which accomplish this may be quaternary surfactants. "19N™," a cationic surfactant commercially available from Halliburton Energy Services, Inc., Duncan, Okla., is an example of a biocide enhancer that may be suitable. When used in combination with biocides such as sodium hypochlorite or glutaraldehyde, in some instances, bacterial problems may be treated in a little as 5 minutes. The term "fast kill" as used herein refers to kill time of 5 minutes or less.

Although quaternary surfactants can be useful when use in conjunction with biocides, some quaternary surfactants may have a fundamental incompatibility with anionic friction reducers, which are also useful in subterranean operations. Although the exact theory is unknown, it is believed that this fundamental incompatibility may be due to the formal charges present on both molecules that may cause the quaternary surfactant and the friction reducer to react and form a precipitant. Additionally, some biocides (such as oxidizers) may degrade the friction reducer. This is viewed as disadvantageous because if the friction reducer degrades or settles out of the solution, the fluid may require a great deal of pressure during pumping, which can lead to safety concerns and inefficient treatments.

SUMMARY

The present invention relates to treatment fluids that are suitable for use in subterranean operations. Among their many benefits, the treatment fluids provide compatible biocide and friction reducing treating effects in a subterranean treatment fluid in a subterranean operation such as a drilling, completion, or stimulation operation. Associated methods are also disclosed.

In one embodiment, the present invention provides a treatment fluid comprising: an aqueous base fluid, a biocide, a biocide enhancer, a friction reducer, and a compatibility aid.

In one embodiment, the present invention provides a method comprising: providing a treatment fluid that comprises: an aqueous base fluid, a biocide, a biocide enhancer, a friction reducer, and a compatibility aid; and introducing the treatment fluid into a subterranean formation.

In one embodiment, the present invention provides a method of fracturing a subterranean formation comprising: providing a fracturing fluid; providing a treatment fluid that comprises: an aqueous base fluid, a biocide, a biocide enhancer, a friction reducer, and a compatibility aid; treating the fracturing fluid with the treatment fluid; and introducing the fracturing fluid into the subterranean formation at a pressure sufficient to create or extend at least one fracture in the subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to treatment fluids that are suitable for use in subterranean operations. Among their many benefits, the treatment fluids provide compatible biocide and friction reducing treating effects in a subterranean treatment fluid in a subterranean operation such as a drilling, completion, or stimulation operation. Associated methods are also disclosed.

Figure 3:
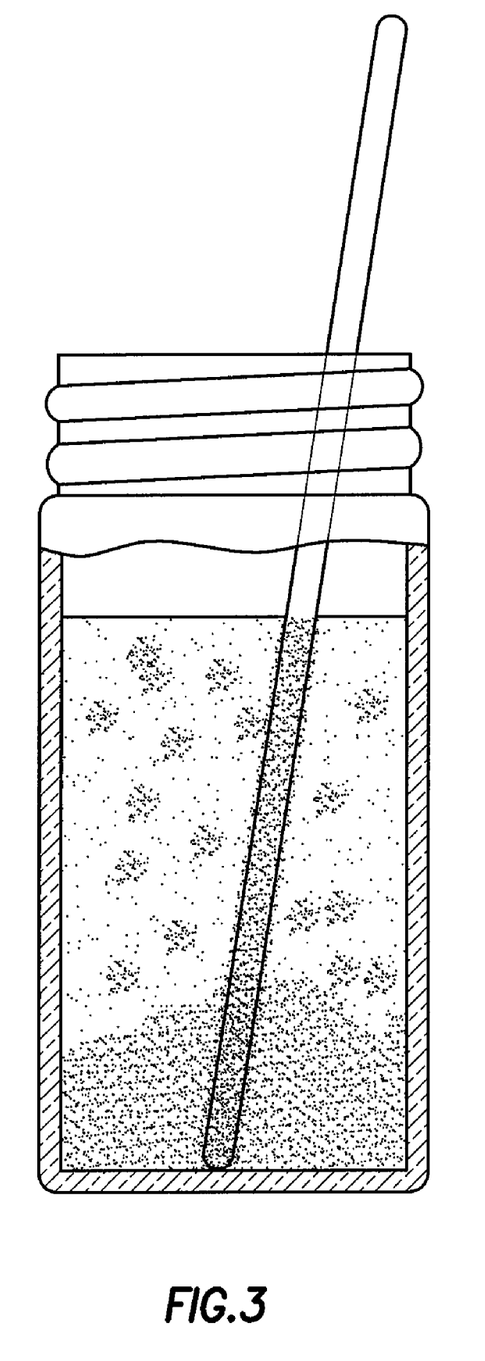
FIG. 3 illustrates some precipitates that may form when a friction reducer is combined with a surfactant.
Figure 4A:
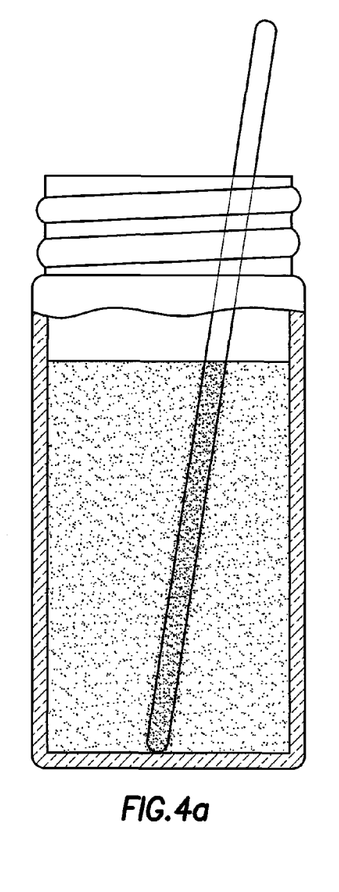
FIGS. 4A and 4B illustrate some precipitates that may form when a friction reducer is combined with a surfactant.
Figure 4B:
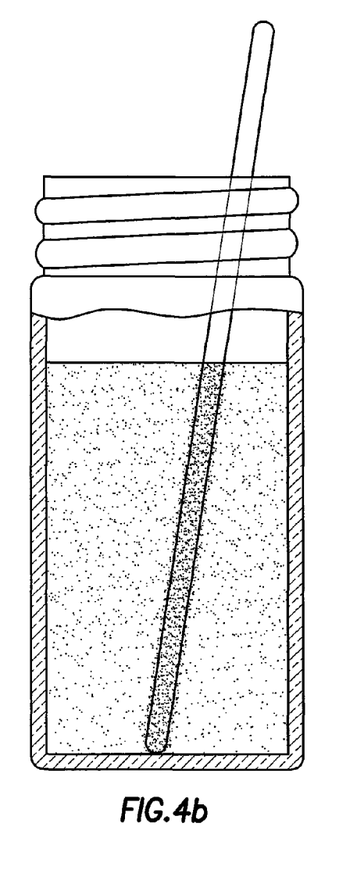

There may be several potential advantages associated with the methods and compositions of the present invention, only some of which are alluded to herein. Of the many potential advantages, one advantage is that the treatment fluids have a biocide, a biocide enhancer, and a friction reducer that are used synergistically to achieve the purposes and effects of the present invention through the addition of a compatibility aid. As discussed above, this is surprising given that typically, when a biocide enhancer and a friction reducer are used together without a compatibility aid, these components will react and form precipitates, as demonstrated by FIGS. 3, 4A, and 4B. Another advantage of the treatment fluids of the present invention may be that a relatively fast kill of bacteria may be achieved.

In some embodiments, the present invention provides treatment fluids that comprise a biocide, a biocide enhancer, a friction reducer, a compatibility aid, and an aqueous base fluid. In additional embodiments, the present invention provides methods at least some of which include providing a treatment fluid comprising a biocide, a biocide enhancer, a friction reducer, a compatibility aid, and an aqueous base fluid and placing the treatment fluid in a well bore penetrating a subterranean formation.

If desired, the biocide and biocide enhancer may be added to the aqueous fluid before being combined with the friction reducer and compatibility aid to treat any bacteria that may be present in the fluid to prevent introduction of that bacteria to the subterranean formation. If desired, the present invention may be added to a subterranean formation to treat any bacteria that may be already present in the subterranean formation.

Suitable examples of aqueous base fluids that may be used in the treatment fluids of the present invention include those aqueous fluids that have an undesirable bioburden. These may include, but are not limited to, fresh water, sea water, salt water, and brines (e.g., saturated salt waters). Suitable brines may include heavy brines. Heavy brines, for the purpose of this application, include brines that may be used to weight up a fluid, such as a treatment fluid, instead of using traditional weighting agents. Brines may comprise water soluble salts. In certain exemplary embodiments, suitable water soluble salts may comprise sodium chloride, calcium chloride, calcium bromide, zinc bromide, potassium carbonate, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and any combination thereof.

The undesirable bioburden may be present in the aqueous fluids as a result of contaminated source waters or contaminated mixing equipment. The undesirable bioburden may also come from fluids that have been previously used. The type of bacteria that may make up the undesirable bioburden can include slime-forming, sulfate-reducing, iron-oxidizing and polymer-degrading bacteria.

A biocide may be included in the treatment fluids of the present invention to reduce the bioburden of the fluid so as to avoid introducing an undesirable level of bacteria into the subterranean formation. Suitable examples of biocides may include both oxidizing biocides and nonoxidizing biocides. Examples of oxidizing biocides may include sodium hypochlorite, hypochlorous acid, chlorine, bromine, chlorine dioxide, and hydrogen peroxide. Examples of non-oxidizing biocides may include aldehydes (such as formaldehyde and glutaraldehyde), quaternary amines, isothizaolines, carbamates, phosphonium quaternary compounds, and halogenated compounds (such as dibromonitrilopropionamide and bromonitropropanediol). Examples of suitable biocides may include those commercially available from Halliburton Energy Services Inc., in Duncan, Okla., under the trade names "ALDACIDE® G," "BE3™," "BE6™," and "BE7™." Factors that determine what biocide will be used in a particular application may include but are not limited to, the cost and performance characteristics of the biocide. An additional factor that may be considered is the kill time of the biocide of the biocide. For example, a biocide with a kill time of less than 5 minutes may be more desirable than a biocide with a kill time of 30 minutes for on the fly treatment. Other factors that may be considered are costs, compatibility with friction reducers, environmental compatibility, and regional drilling practices. One skilled in the art with the benefit of this disclosure will be able to choose a suitable biocide for a particular application in view of these considerations.

The concentration of the biocide in a treatment fluid of the present invention depends on, among other things, the type of biocide used. Generally, it may be desirable to use as little biocide as possible in view of the pH changes and costs associated with the use of biocides. In some embodiments, the biocide may be present in a treatment fluid in the range of from about 2 ppm to about 100,000 ppm by weight of the water being treated. In some embodiments, the biocide may be present in the range from about 10 ppm to about 1,000 ppm by weight of the water being treated. The concentration of biocide use will also depend on the bioburden; generally, the concentration of the biocide will increase as the bioburden increases.

An example of a suitable biocide may be sodium hypochlorite. Sodium hypochlorite may be present in the treatment fluid in an amount in the range of from 10 ppm to 10,000 ppm by weight of water being treated. In another embodiment, it may be desirable to include the sodium hypochlorite in the treatment fluid in an amount sufficient to obtain a free chlorine concentration of at least 2 ppm. In another embodiment, it may be desirable to have an amount of sodium hypochlorite sufficient to obtain a free chlorine concentration of 10 to 1,000 ppm. In another embodiment, it may be desirable to have an amount of sodium hypochlorite sufficient to obtain a free chlorine concentration of 100 to 1,000 ppm in the treatment fluid. When using sodium hypochiorite, the use of a pH adjusting agent may be desirable as sodium hypochlorite is a more effective biocide at a lower pH. Suitable examples pH adjusting agents are shown in U.S. Patent Application No. 2009/0062156, entitled "Methods of Treating a Subterranean Formation Including a Biocidal Treatment," the entirety of which is incorporated herein.

A biocide enhancer may be used in the fluids of the present invention to enhance the effectiveness of the chosen biocide. Suitable examples of a biocide enhancer include, but are not limited to, a surfactant selected from the group consisting of: quaternary surfactants, betaines, amine oxides, alkyl amines, alkyl aryl amines, alkyl aryl ethoxylates, and amine ethoxylates. Combinations of these may be suitable as well. Suitable examples of biocide enhancers may include surfactants and nonemulsifiers such as "EFS-2," "EFS-3," "19N™," and "HC-2™," which are commercially available from Halliburton Energy Services, Duncan, Okla. While not being limited by a particular theory, it is believed that a biocide enhancer may penetrate the cell walls of the bacteria or slime agents, thereby enabling the biocide to more effectively deal with the bacteria. The biocide enhancer may also make it easier for the biocide to penetrate the walls of the bacteria. The biocide enhancer may also act as a wetting agent for the biocide.

In some embodiments, the biocide enhancer may be present in a treatment fluid in an amount in the range of from about 2 ppm to about 25,000 ppm by weight of the aqueous base fluid being treated. In certain embodiments, the biocide enhancer may be present in a treatment fluid in an amount in the range of from about 50 ppm to about 100 ppm by weight of the aqueous base fluid being treated. The amount of biocide enhancer may depend upon, among other factors, the bioburden present in the aqueous base fluid.

Suitable friction reducers for use in the treatment fluids of the present invention should, among other things, reduce energy losses due to friction in the aqueous treatment fluids of the present invention. For example, friction reducers suitable for use in the present invention may reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore. Any water-based anionic friction reducing polymer suitable for use in subterranean applications may be suitable for use in the present invention. An example of a suitable water-based friction reducing polymer comprises acrylamide. In some embodiments, polymer comprising acrylamide may be partially hydrolyzed acrylamide. As used in this disclosure, "partially hydrolyzed acrylamide" refers to acrylamide wherein in the range of about 3% to about 70% of the amide groups have been hydrolyzed to carboxyl groups. An example of a suitable water-based friction reducing polymer comprising acrylamide is a copolymer comprising acrylamide and acrylic acid.

The term "copolymer," as used herein, is not limited to polymers comprising two types of monomeric units, but includes any combination of monomeric units, e.g., terpolymers, tetrapolymers, and the like. Suitable water-based friction reducing polymers may further comprise additional monomers, such as 2-acrylamido-2-methylpropane sulfonic acid, N,N-dimethylacrylamide, vinyl sulfonic acid, N-vinyl acetamide, N-vinyl formamide, itaconic acid, methacrylic acid, diallyl dimethyl ammonium chloride, and combinations thereof.

In some embodiments, the acrylamide may be present in the water-based friction reducing polymers in an amount in the range of from about 5% to about 100% by weight of the polymer. In some embodiments, the acrylamide may be present in the water-based friction reducing polymers in an amount in the range of from about 50% to about 95% by weight of the polymer. In some embodiments, the acrylamide may be present in the water-based friction reducing polymers in an amount in the range of from about 60% to about 90% by weight of the polymer. In some embodiments, the acrylamide may be present in the water-based friction reducing polymers in an amount of about 70% by weight of the polymer.

The water-based friction reducing polymers further may comprise acrylic acid. In some embodiments, the acrylic acid may be present in the water-based friction reducing polymers in an amount in the range of from about 5% to about 95% by weight of the polymer. In some embodiments, the acrylic acid may be present in the water-based friction reducing polymers in an amount in the range of from about 5% to about 50% by weight of the polymer. In some embodiments, the acrylic acid may be present in the water-based friction reducing polymers in an amount in the range of from about 10% to about 40% by weight of the polymer. In some embodiments, the acrylic acid may be present in the water-based friction reducing polymers in an amount in the range of from about 20% to about 40% by weight of the polymer. In some embodiments, the acrylic acid may be present in the water-based friction reducing polymers in an amount of about 30% by weight of the polymer.

Optionally, the friction reducing copolymers for use in the treatment fluids of the present invention may further comprise other monomers in addition to acrylamide and acrylic acid. For example, in some embodiments, the friction reducing copolymers may comprise 2-acrylamido-2-methylpropane sulfonic acid, N,N-dimethylacrylamide, vinyl sulfonic acid, N-vinyl acetamide, N-vinyl formamide, itaconic acid, methacrylic acid, diallyl dimethyl ammonium chloride, and mixtures thereof.

In certain embodiments, 2-acrylamido-2-methylpropane sulfonic acid may be present in the friction reducing copolymers of the present invention in an amount in the range of from about 0.1% to about 30% by weight of the copolymer. An example of a suitable friction reducing copolymer may comprise acrylamide in an amount in the range of from about 70% to about 85% by weight of the copolymer, acrylic acid in an amount in the range of from about 10% to about 12.5% by weight of the copolymer, and 2-acrylamido-2-methylpropane sulfonic acid in an amount in the range of from about 2.5% to about 20% by weight of the copolymer.

In certain embodiments, N,N-dimethylacrylamide may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 80% by weight of the copolymer, acrylic acid in an amount in the range of from about 10% to about 12.5% by weight of the copolymer, and N,N-dimethylacrylamide in an amount in the range of from about 2.5% to about 10% by weight of the copolymer.

In some embodiments, vinyl sulfonic acid may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, and vinyl sulfonic acid in an amount in the range of from about 0.1% to about 5% by weight of the copolymer.

In some embodiments, N-vinyl acetamide may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, and N-vinyl acetamide in an amount in the range of from about 0.1% to about 5% by weight of the copolymer.

In some embodiments, N-vinyl formamide may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, and N-vinyl formamide in an amount in the range of from about 0.1% to about 5% by weight of the copolymer.

Other suitable friction reducers may comprise polysaccharides having an anionic charge. Examples of suitable polysaccharides are anionic biopolymers such as xanthan and wellan and also carboxymethylhydroxypropyl guar. Other examples of suitable friction reducing polymers are described in U.S. Pat. Nos. 7,004,254, 7,271,134, and 7,232,793, the disclosures of are incorporated herein by reference.

The friction reducing polymers for use in the treatment fluids of the present invention should have a molecular weight sufficient to provide a desired level of friction reduction. Generally, friction reducing polymers having higher molecular weights may be needed to provide a desirable level of friction reduction. For example, in some embodiments, the average molecular weight of the friction reducing polymers may be in the range of from about 1,000,000 to about 50,000,000, as determined using intrinsic viscosities. In other embodiments, the average molecular weight of the friction reducing polymers may be in the range of from about 2,000,000 to about 20,000,000. In other embodiments, the average molecular weight of the friction reducing polymers may be in the range of from about 7,500,000 to about 15,000,000. Those of ordinary skill in the art will recognize that friction reducing polymers having molecular weights outside the listed range may still provide some degree of friction reduction in an aqueous treatment fluid.

The friction reducing polymers should be included in the treatment fluids of the present invention in an amount sufficient to provide the desired reduction of friction without forming a gel. Formation of a gel is dependent on a number of factors including the particular friction reducing polymer used, concentration of the friction reducing polymer, temperature, and a variety of other factors known to those of ordinary skill in the art. While the addition of friction reducing polymers may minimally increase the viscosity of the treatment fluid, the polymers are generally not included in the treatment fluid of the present invention in an amount sufficient to substantially increase in viscosity. In some embodiments, the friction reducing polymer may be present in an amount in the range of from about 20 ppm to about 5,000 ppm by weight of the water being treated. In some embodiments, the friction reducing polymer may be present in an amount in the range of from about 100 ppm to about 3,000 ppm by weight of the water being treated. In other embodiments, the friction reducing polymer may be present in an amount in the range of from about 100 ppm to about 1,000 ppm by weight of the water being treated.

The friction reducing polymers may be provided in any suitable form, including in a solid form, as an oil-external emulsion polymer, or as a component of an aqueous solution. In embodiments where a particular friction reducing polymer is provided as an oil-external emulsion polymer, the oil-external emulsion polymer may comprise water, a water-immiscible liquid, an emulsifying surfactant, and a friction reducing polymer. Suitable oil-external emulsion polymer further may comprise inhibitors, salts, and inverters. As those of ordinary skill in the art will appreciate, with the benefit of this disclosure, upon addition to the aqueous treatment fluid, the emulsion should invert, releasing the friction reducing polymer into the treatment fluid.

A compatibility aid may be included in the treatment fluids of the present invention, inter alia, to prevent an undesirable reaction between the friction reducer and the biocide enhancer. Suitable compatibility aids can be any type of compatibility aid that is capable of performing this function. Suitable examples of compatibility aids may include mutual solvents, surfactants, and microemulsion surfactants. Examples of commercially available suitable compatibility aids may include "GASPERM 1000™" (a microemulsion surfactant), "PEN-88M™" (a surfactant), "MUSOL®" (a mutual solvent), "MUSOL® A" (a mutual solvent), "MUSOL® E" (a mutual solvent), "SSO-21™" (a surfactant), "SSO-21E™" (a surfactant), and "SSO-21M™" (a surfactant), which are commercially available from Halliburton Energy Services, Duncan, Okla.

Compatibility aids comprising mutual solvents may be present in the treatment fluid in an amount from 30,000 to 200,000 ppm by weight of the aqueous base fluid being treated. In certain embodiments, compatibility aids comprising mutual solvents may be present in the treatment fluid in an amount from 50,000 ppm to about 100,000 ppm by weight of the aqueous base fluid being treated. Compatibility aids comprising surfactants or microemulsion surfactants may be present in the treatment fluid in an amount from 100 ppm to about 20,000 ppm by weight of the aqueous base fluid being treated. In certain embodiments, compatibility aids comprising surfactants or microemulsion surfactants may be present in the treatment fluid in an amount from 500 ppm to about 2,000 ppm by weight of the aqueous base fluid being treated.

Depending on the end use of the treatment fluid, in some embodiments, the treatment fluid may further comprise additional additives such as a gas, proppant particulates, a foaming agent, gelling agent, a pH control agent, a breaker, an oxidizing breaker, a gel stabilizer, a fluid loss control additive, a clay stabilizer, a corrosion inhibitor, a crosslinking agent, a scale inhibitors, a catalyst, and an additional surfactant.

The treatment fluids of the present invention may be used in a variety of subterranean treatments for which treatment fluids are suitable. Examples of such treatments include, but are not limited to, drilling, completion, and fracturing operations. The treatment fluid of the present invention may be useful as a treatment fluid in any treatment operation that requires a friction reducer.

An example of a composition of the present invention comprises a treatment fluid that comprises: an aqueous base fluid, a biocide, a biocide enhancer, a friction reducer, and a compatibility aid.

An example of a method of the present invention comprises a method comprising: providing a treatment fluid comprising an aqueous base fluid, a biocide, a biocide enhancer, a friction reducer, and a compatibility aid; and introducing the treatment fluid into the subterranean formation.

Another example of a method of the present invention comprises a method of fracturing a subterranean formation comprising: providing a fracturing fluid; providing a treatment fluid that comprises an aqueous base fluid, a biocide, a biocide enhancer, a friction reducer, and a compatibility aid; treating the fracturing fluid with the treatment fluid; and introducing the fracturing fluid into the subterranean formation at a pressure sufficient to create or extend at least one fracture in the subterranean formation.

To facilitate a better understanding of the present invention, the following examples of certain aspects of some embodiments are given. In no way should the following examples be read to limit, or define, the entire scope of the invention.

EXAMPLES

Example 1

Figure 1:
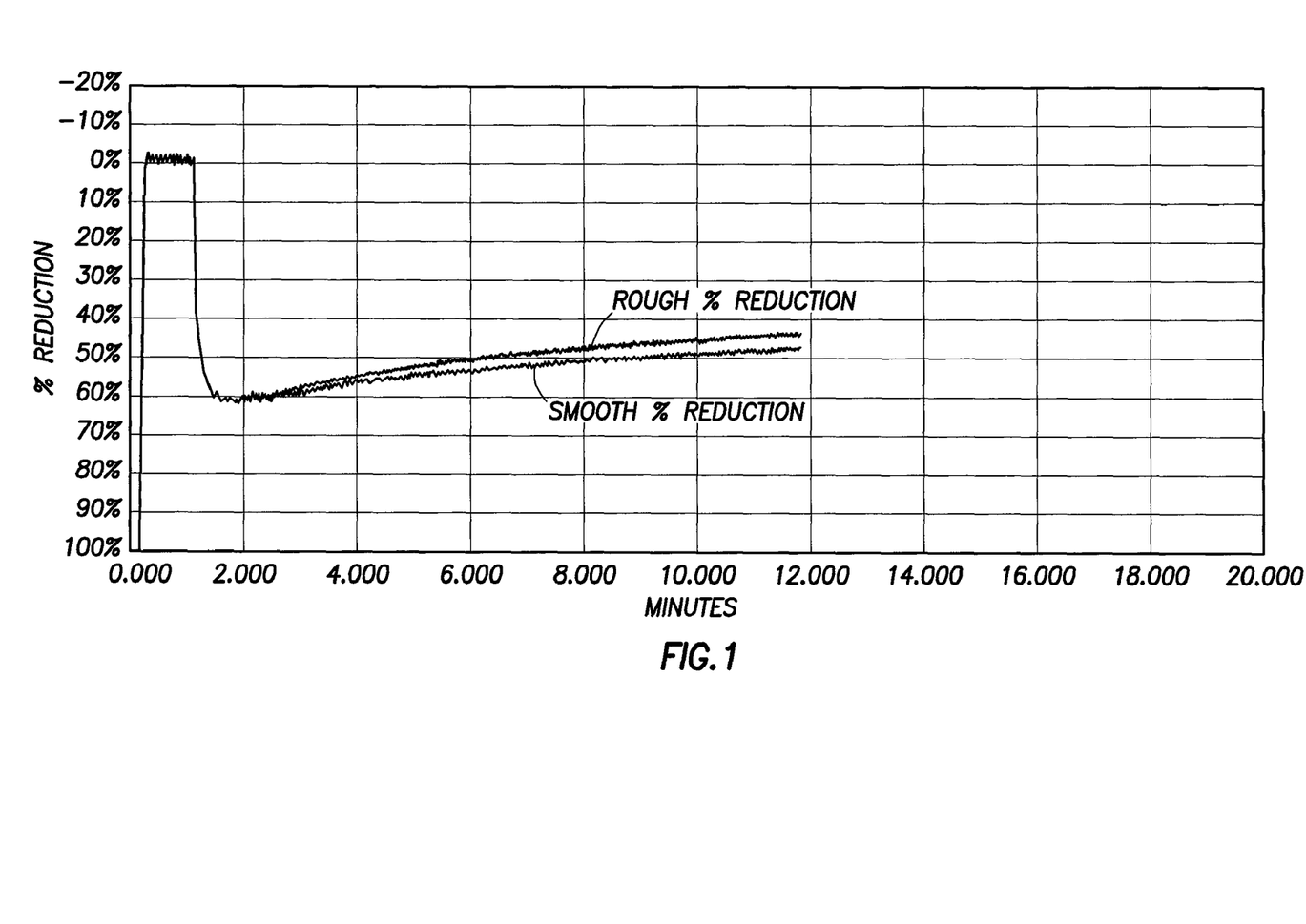
FIG. 1 illustrates the results of friction reducing tests.

Example 1 is an example of friction reducing tests performed on an embodiment of a treatment fluid of the present invention. The treatment fluid of this example comprised 500 ppm of friction reducer "FR-56™" (commercially available from Halliburton Energy Services, Duncan, Okla.), 120 ppm of viscosity reducing agent "OPTIKLEEN WF™" (commercially available from Halliburton Energy Services, Duncan, Okla.), 1,000 ppm of microemulsion surfactant "GASPERM 1000™" (commercially available from Halliburton Energy Services, Duncan, Okla.), 50 ppm of $NaClO_3$, 100 ppm of cationic surfactant "19N™" (commercially available from Halliburton Energy Services, Duncan, Okla.), and 500 ppm of acetic acid. The results of this test are provided in FIG. 1. As can be seen from FIG. 1, it took approximately 15 seconds to reach 0.9 Maximum Reduction.

Example 2

Figure 2:
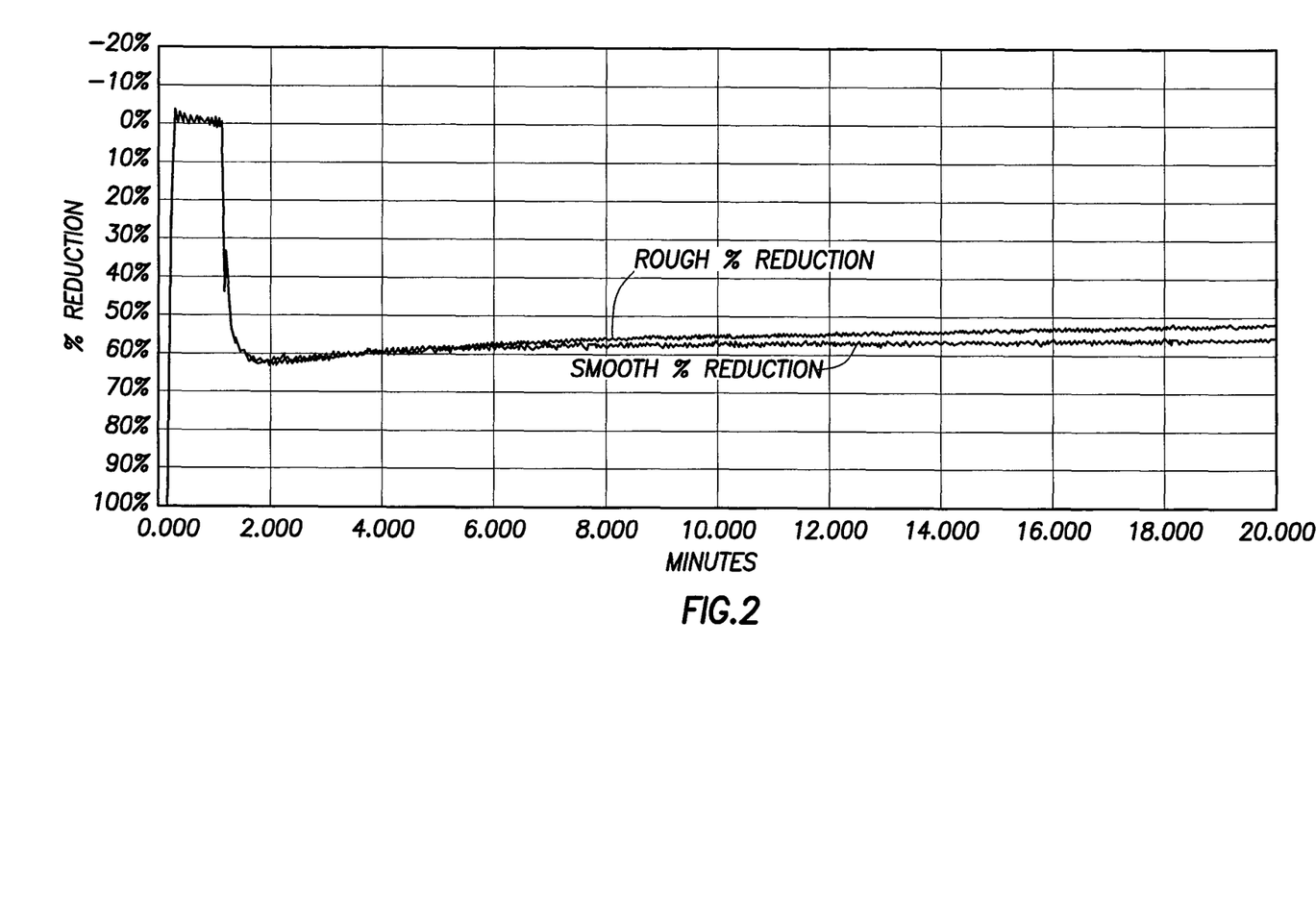
FIG. 2 illustrates the results of friction reducing tests.

Example 2 is an example of friction reducing test performed on an embodiment of a treatment fluid of the present invention. The treatment fluid of this example comprised 500 ppm of friction reducer "FR-56™" (commercially available from Halliburton Energy Services, Duncan, Okla.), 120 ppm of viscosity reducing agent "OPTIKLEEN WF™" (commercially available from Halliburton Energy Services, Duncan, Okla.), and 600 ppm of a mixture containing 5 parts of the microemulsion surfactant "GASPERM 1000™" (commercially available from Halliburton Energy Services, Duncan, Okla.) and 1 part of the cationic surfactant "19N™" (commercially available from Halliburton Energy Services, Duncan, Okla.) in pond water. The results of this test are provided in FIG. 2. As can be seen from FIG. 2, it took approximately 14 seconds to reach 0.9 Maximum Reduction.

Example 3

Figure 5:
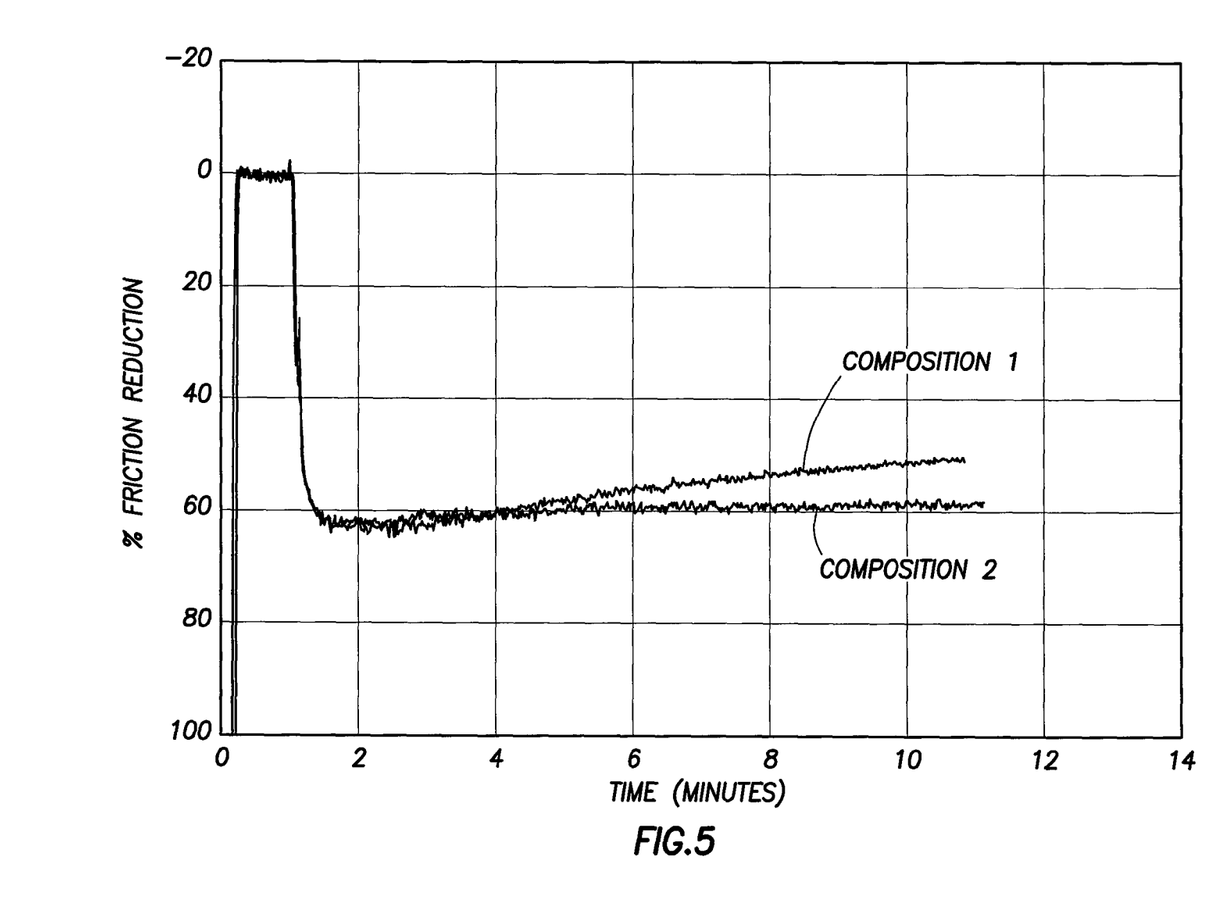
FIG. 5 illustrates the results of friction reduction tests performed as described herein.

In this example, friction loop tests were performed on two treatment compositions, and samples were taken for bacterial assays on one of the treatment compositions. The treatment fluid of composition 1 comprised 500 ppm of anionic friction reducer "FR-56™" (commercially available from Halliburton Energy Services, Duncan, Okla.), 50 ppm $NaClO_3$, and 100 ppm of cationic surfactant "19N™" (commercially available from Halliburton Energy Services, Duncan, Okla.). Initially all of these components except FR-56™ were added to 10 liters of tap water, and this solution was circulated at a rate of 8.5±0.2 gallons per minute in a friction loop containing a smooth pipe test section with an inside diameter of 0.55 inches. After approximately one minute, FR-56™ was injected into the solution flowing through the friction loop, and % friction reduction was measured. The results of this test are provided in FIG. 5.

The treatment fluid of composition 2 comprised 500 ppm of anionic friction reducer "FR-56™" (commercially available from Halliburton Energy Services, Duncan, Okla.), 120 ppm of viscosity reducing agent "OPTIKLEEN WF™" (commercially available from Halliburton Energy Services, Duncan, Okla.), 1,000 ppm of microemulsion surfactant "GASPERM 1000™" (commercially available from Halliburton Energy Services, Duncan, Okla.), 50 ppm $NaClO_3$, and 100 ppm of cationic surfactant "19N™" (commercially available from Halliburton Energy Services, Duncan, Okla.). Initially 50 ppm of $NaClO_3$ and 100 ppm of cationic surfactant 19N™ were added to 10 liters of pond water containing appreciable amounts of bacteria, and this solution was circulated for 10 minutes at a rate of 8.5±0.2 gallons per minute in a fiction loop containing a smooth pipe test section with an inside diameter of 0.55 inches. Samples were collected after one minute and after 10 minutes of circulation for bacterial assay. At approximately the 10-minute mark, 120 ppm of viscosity reducing agent OPTIKLEEN WF™ and 1000 ppm of microemulsion surfactant GASPERM 1000™ were added simultaneously to the blender. Shortly thereafter, 500 ppm of anionic friction reducer FR-56™ was injected into the solution flowing through the friction loop, and % friction reduction was measured. Additional samples were collected for bacterial assay at approximately the 10.5-minute and 20-minute marks.

It is worth noting that the differences in the formulations between composition 1 and composition 2 is that composition 2 contains water with appreciable amounts of bacteria, the viscosity reducing agent OPTIKLEEN WF™, and the microemulsion surfactant GAS PERM 1000™. Appreciable amounts of bacteria in the water and the addition of the viscosity reducing agent OPTIKLEEN WF™ will not increase friction reduction performance; however, in certain situations it may adversely affect the friction reduction performance. Therefore, we believe at this time that it may be highly probable that any perceived differences between the friction reduction performances of the two compositions is attributed to the use of GASPERM 1000™ as a compatibility aid.

Figure 6:
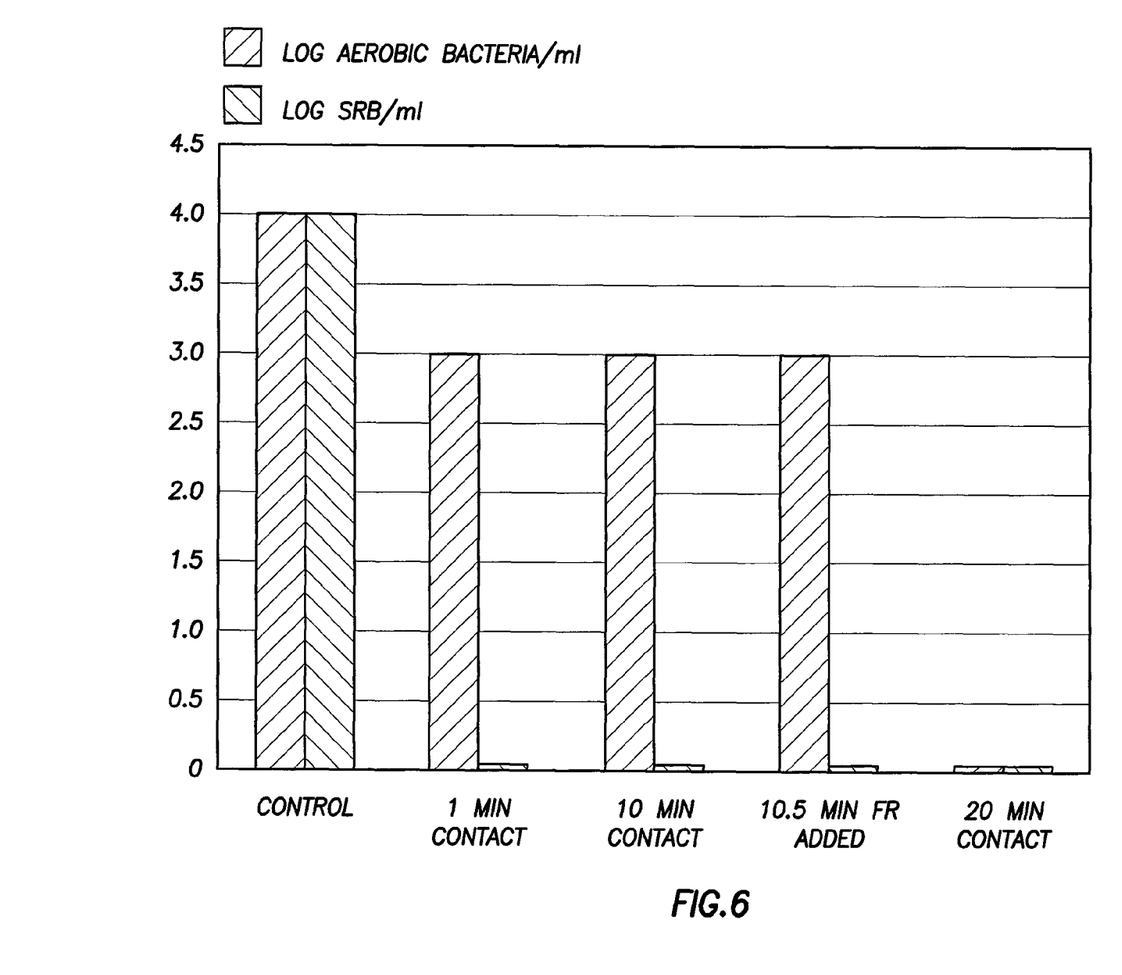
FIG. 6 illustrates the results of bacterial tests performed as described herein.

The composite results of the bacteria assay tests are displayed in FIG. 6. These results show that aerobic bio-burden is reduced, especially with a 20-minute contact time; and more importantly, the sulfate-reducing bacterial bio-burden is significantly reduced at all contact times. The % friction reduction versus time is displayed in FIG. 5 where the time scale was shifted to match the results of composition 2 to the results of composition 1 at the point of injection of FR-56™ into the friction loop. This example shows that GASPERM 1000™ acts as a compatibility aid between the anionic friction reducer FR-56™ and the cationic surfactant 19N™, and preserves both the friction reduction performance of FR-56™ and the bio-burden reduction performance of the biocide enhancer 19N™ and the biocide $NaClO_3$.

Example 4

Figure 7:
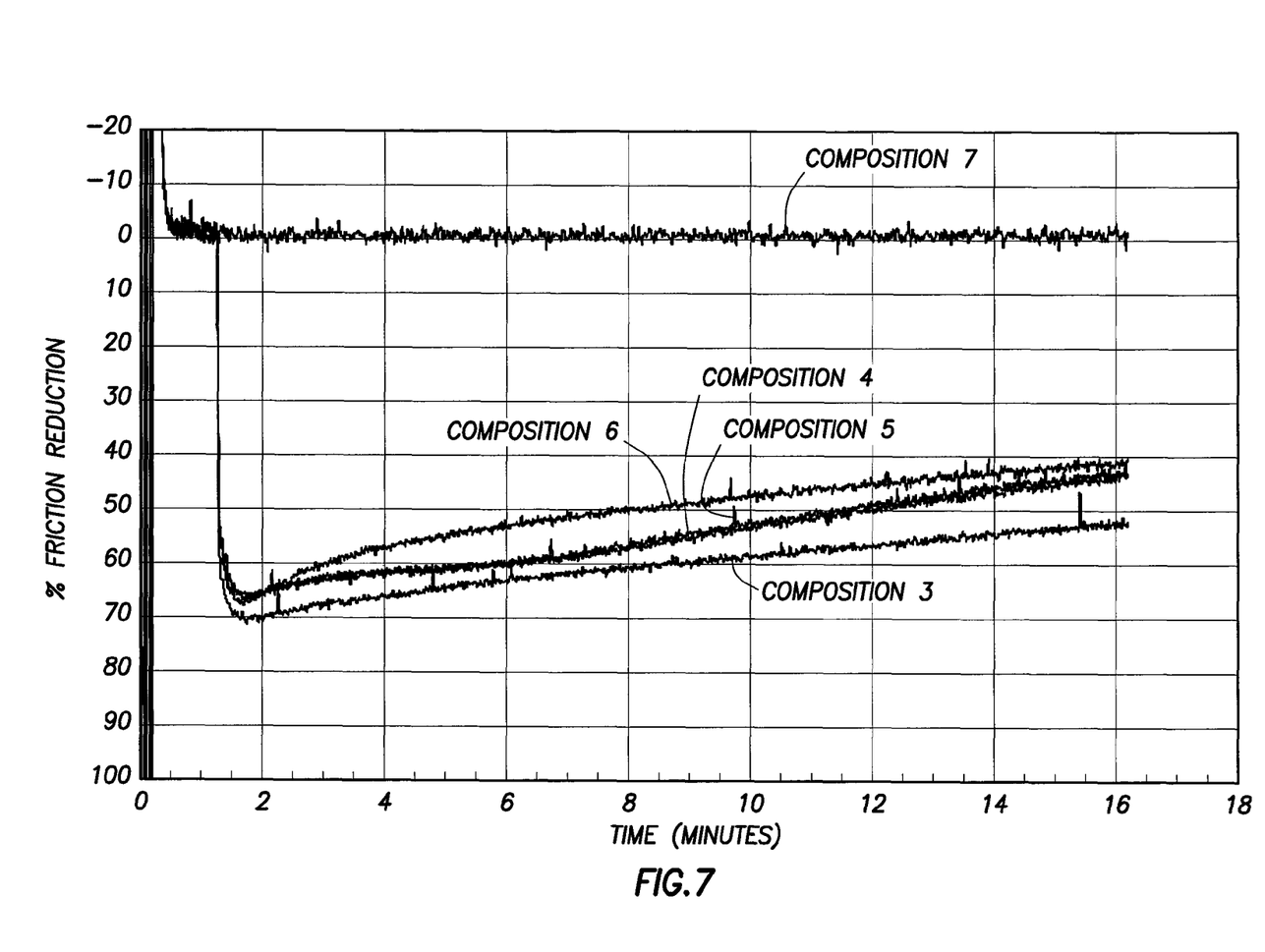
FIG. 7 illustrates the results of friction reduction tests performed as described herein.

In this example, friction loop tests were performed on five treatment compositions. Composition 3 comprised 500 ppm of friction reducer "FR-56™" (commercially available from Halliburton Energy Services, Duncan, Okla.). Composition 4 comprised 500 ppm of friction reducer "FR-56™" (commercially available from Halliburton Energy Services, Duncan, Okla.), 1000 ppm of compatibility aid, and 200 ppm of cationic surfactant "19N™" (commercially available from Halliburton Energy Services, Duncan, Okla.). Composition 5, similar to composition 4, comprised 500 ppm of friction reducer FR-56™" (commercially available from Halliburton Energy Services, Duncan, Okla.), 1000 ppm of a compatibility aid, and 200 ppm of cationic surfactant "19N™" (commercially available from Halliburton Energy Services, Duncan, Okla.). Composition 6 comprised 500 ppm of friction reducer "FR-56™" (commercially available from Halliburton Energy Services, Duncan, Okla.) and 200 ppm of cationic surfactant "19N™" (commercially available from Halliburton Energy Services, Duncan, Okla.). Composition 7 comprised 250 ppm of friction reducer "FR-56™" (commercially available from Halliburton Energy Services, Duncan, Okla.) and 1000 ppm of cationic surfactant "19N™" (commercially available from Halliburton Energy Services, Duncan, Okla.). Friction reduction experiments were conducted on each of these compositions, and their results are displayed in FIG. 7. For each composition tested, initially all of the components except FR-56™ were circulated at a rate of 26.7±0.5 gallons per minute in a friction loop containing a smooth pipe test section with an inside diameter of 0.56 inches. After approximately one minute, FR-56™ was injected into the solution flowing through the friction loop, and % friction reduction was measured. We believe at this time that it may be apparent from FIG. 7 that the compositions containing the anionic friction reducer, the biocide enhancer (19N™), and the compatibility aid outperformed the compositions comprising a friction reducer and biocide enhancer (19N™).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by any amount (e.g., 1 percent, 2 percent, 5 percent, or, sometimes, 10 to 20 percent). Whenever a numerical range, R, with a lower limit, RL, and an upper limit, RU, is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   providing a treatment fluid that comprises:
   an aqueous base fluid,
   a biocide,
   a biocide enhancer,
   a friction reducer, and
   a compatibility aid, wherein the compatibility aid at least partially prevents the friction reducer and biocide enhancer from reacting so as to form a precipitate; and
   introducing the treatment fluid into a subterranean formation.

2. The method of claim 1 wherein the biocide comprises at least one biocide selected from the group consisting of: sodium hypochlorite, hypochlorous acid, chlorine, bromine, chlorine dioxide, hydrogen peroxide, an aldehyde, a quaternary amine, an isothizaoline, a carbamate, a phosphonium quaternary compound, and a halogenated compound.

3. The method of claim 1 wherein the biocide enhancer comprises at least one biocide enhancer selected from the group consisting of: a quaternary surfactant, a betaine, an amine oxide, an alkyl amine, an alkyl aryl amine, an alkyl aryl ethoxylate, and an amine ethoxylate.

4. The method of claim 1 wherein the friction reducer comprises a polymer comprising acrylamide.

5. The method of claim 1 wherein the compatibility aid comprises at least one compatibility aid selected from the group consisting of: a mutual solvent, a surfactant, and a microemulsion surfactant.

6. The method of claim 1 wherein the treatment fluid further comprises at least one additive selected from the group consisting of: a gas, a proppant particulate, a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitors, a catalyst, and an additional surfactant.

7. A method of fracturing a subterranean formation comprising:
   providing a fracturing fluid;
   providing a treatment fluid that comprises:
   an aqueous base fluid,
   a biocide,
   a biocide enhancer,
   a friction reducer, and
   a compatibility aid, wherein the compatibility aid at least partially prevents the friction reducer and biocide enhancer from reacting so as to form a precipitate;
   treating the fracturing fluid with the treatment fluid; and
   introducing the fracturing fluid into the subterranean formation at a pressure sufficient to create or extend at least one fracture in the subterranean formation.

8. The method of claim 7 wherein the biocide comprises at least one biocide selected from the group consisting of: sodium hypochlorite, hypochlorous acid, chlorine, bromine, chlorine dioxide, hydrogen peroxide, an aldehyde, a quaternary amine, an isothizaoline, a carbamate, a phosphonium quaternary compound, and a halogenated compound.

9. The method of claim 7 wherein the biocide enhancer comprises at least one biocide enhancer selected from the group consisting of: a quaternary surfactant, a betaine, an amine oxide, an alkyl amine, an alkyl aryl amine, an alkyl aryl ethoxylate, and an amine ethoxylate.

10. The method of claim 7 wherein the friction reducer comprises a polymer comprising acrylamide.

11. The method of claim 7 wherein the compatibility aid comprises at least one compatibility aid selected from the group consisting of: a mutual solvent, a surfactant, and a microemulsion surfactant.

12. The method of claim 7 wherein the treatment fluid further comprises at least one additive selected from the group consisting of: a gas, a proppant particulate, a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitors, a catalyst, and an additional surfactant.

* * * * *